J. ENGLAENDER.
Horse Collar.
No. 105,443.
Patented July 19, 1870.
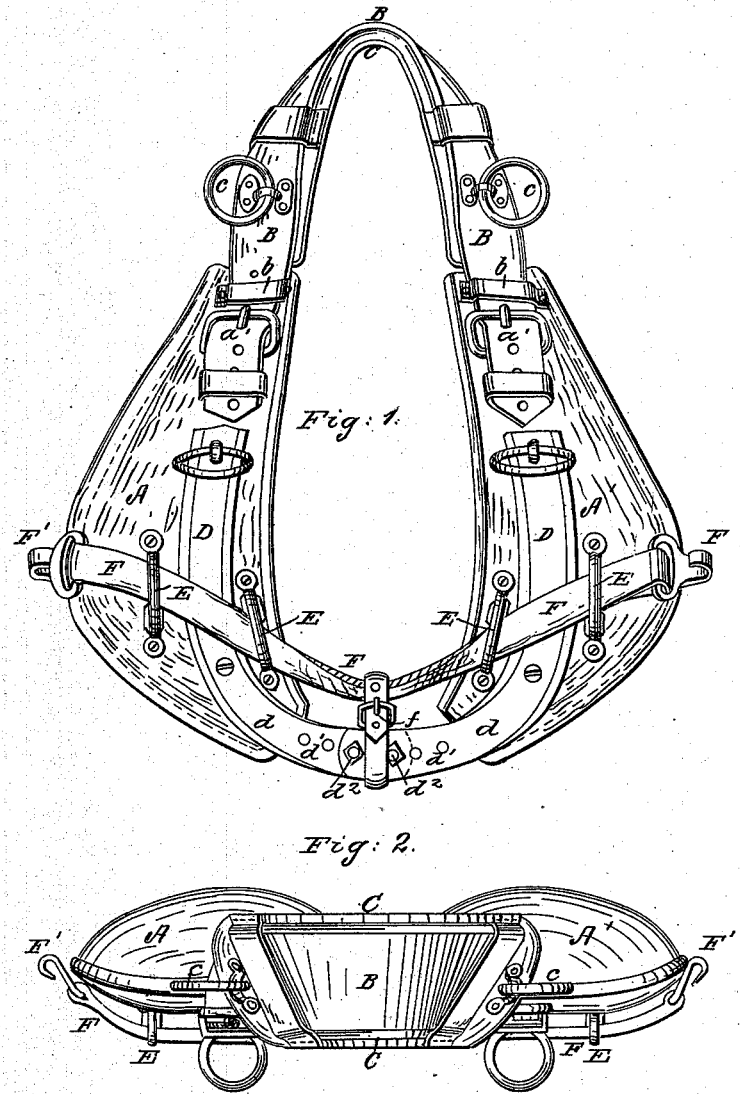
Witnesses:
J. W. Herthel
Robert Burns
Inventor:
Joseph Englaender
by his Attys.
Herthel & Co.

United States Patent Office.

JOSEPH ENGLAENDER, OF SEDALIA, MISSOURI, ASSIGNOR TO HIMSELF AND EUGENE LUNGSTRAS, OF SAME PLACE.

Letters Patent No. 105,443, dated July 19, 1870.

IMPROVEMENT IN HORSE-COLLARS.

The Schedule referred to in these Letters Patent and making part of the same.

*To all whom it may concern:*

Be it known that I, JOSEPH ENGLAENDER, of Sedalia, in the county of Pettis and State of Missouri, have made a certain new and useful Improvement in Horse-Collars; and I do hereby declare that the following is a full and true description thereof, reference being had to the accompanying drawing and to the letters of reference marked thereon.

This invention relates, principally, to an improved detail construction of the collar, to give greater adjustability; and said invention relates, secondly, to the manner of attaching the traces to the collar, and the manner of distributing the draft of the traces thereon.

To enable those herein skilled to make and use my said invention, I will now more fully describe the same, referring to the accompanying—

Figure 1 as a front elevation; and to

Figure 2 as a top plan.

I construct my said collar of two separate cushions or collar-halves A A'. The bodies of said collar-halves are usually made of wood, of the required form, and "stuffed" with the usual "stuffing" or "padding" material, and may be either entirely enveloped by the leather lining, as ordinarily done, or, if desired, the under or inner surfaces thereof need only to be properly lined, so as to prevent chafing upon the skin of the draft animal.

The top-lining parts of said collar-halves A A' are connected by a leather strap, B, which passes through the leather loops $b$, and is secured to the buckles $a$ $a'$, which are firmly attached to each collar-body.

A suitable leather padding, C, is placed under said strap B, thus forming, in conjunction therewith, an easy neck-yoke for the animal.

On the outer-surface part of said strap B are secured the rings $c$, through which the reins pass.

Said collar-halves have, furthermore, on their outer surface, properly secured by screws, or similar devices, the hame-plates D, (usually made of iron,) and which have long curved ends, $d$, provided with a series of holes, $d^1$.

By means of the set-screws $d^2$, the ends of said hame-plates are fastened or joined, and may be properly fitted around the breast of the horse.

On the inner side of the hame-plate ends, an iron loop or staple is attached to said screws $d^2$, which serves for the attachment of the martingale strap.

To the body of the collar, I furthermore secure the several staples E, in the positions, generally, as indicated in fig. 1. The breast-strap F, which passes through the same, is thus retained in the required position.

Said breast-strap has, at its ends, proper draft or snap-hooks F', to which directly attaches the usual trace, chain, or hame-tug.

A strap, $f$, passing through the staple, and around the breast-strap and hame-plate ends, prevents said breast-strap from being drawn up on the breast of the animal.

My said collar is formed with the usual rings and hooks belonging to the same.

It is evident that, by means of the neck-yoke strap and the adjustability of the hame-plates, the collar-halves can be made to suit or accommodate any horse, and that, by the simplicity of the construction of its different parts, a collar is formed more particularly adapted to all the demands of trade.

Having thus fully described my said invention,

What I claim is—

1. The collar-halves A A', with leather lining, arranged with strap B, buckles $a$ $a'$, and neck-padding C, when combined with the hame-plates D, arranged with adjustable ends $d$ and holes $d^1$, substantially as set forth.

2. The staples E, breast-band F, and strap $f$, combined substantially as set forth.

In testimony of said invention I have hereunto set my hand in presence of—

JOSEPH ENGLAENDER.

Witnesses:
EUGENE LUNGSTRAS,
WILLIAM W. HERTHEL,
FRIEDOLIN SAURER.